(12) United States Patent
Lee

(10) Patent No.: US 7,369,347 B2
(45) Date of Patent: May 6, 2008

(54) APPARATUS AND METHOD FOR PIEZOELECTRIC LAYER AS VERTICAL MICRO-ACTUATOR IN SLIDER OF A HARD DISK DRIVE

(75) Inventor: SungChang Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 211 days.

(21) Appl. No.: 11/417,697

(22) Filed: May 3, 2006

(65) Prior Publication Data

US 2007/0258169 A1 Nov. 8, 2007

(51) Int. Cl.
G11B 21/02 (2006.01)

(52) U.S. Cl. ........................................................ 360/75
(58) Field of Classification Search ................... 360/75, 360/69, 234, 291.9, 294.4, 294.7; 310/317, 310/369; 369/300; 356/28
See application file for complete search history.

(56) References Cited

U.S. PATENT DOCUMENTS

| | | | |
|---|---|---|---|
| 6,580,687 B1 * | 6/2003 | Cumpson et al. ............ 369/300 |
| 6,611,319 B2 * | 8/2003 | Wang ............................ 356/28 |
| 6,653,763 B2 * | 11/2003 | Wang et al. ................. 310/369 |
| 6,856,070 B2 * | 2/2005 | Wang et al. ................. 310/317 |
| 6,914,739 B2 * | 7/2005 | Feliss et al. .................... 360/69 |
| 6,950,266 B1 * | 9/2005 | McCaslin et al. ............. 360/75 |
| 7,130,160 B2 * | 10/2006 | Kwon et al. ............. 360/294.7 |
| 7,206,160 B2 * | 4/2007 | Lee et al. ...................... 360/75 |
| 7,256,967 B2 * | 8/2007 | Yao et al. ................. 360/291.9 |
| 2007/0165333 A1 * | 7/2007 | Kwon et al. ............. 360/294.4 |
| 2007/0258168 A1 * | 11/2007 | Lee et al. .................... 360/234 |

* cited by examiner

Primary Examiner—Fred F. Tzeng
(74) Attorney, Agent, or Firm—Earle Jennings; GSS Law Group

(57) ABSTRACT

Slider used to access data on rotating disk in hard disk drive, including vertical micro-actuator forming piezoelectric layer perpendicular to air bearing surface and coupled to deformation region including read-write head. Slider further includes vertical control signal stimulating vertical micro-actuator to alter vertical position. The vertical control signal stimulates vertical micro-actuator to increase and decrease vertical position with potential differences of opposite sign. Flexure finger including vertical control signal path providing vertical control signal and micro-actuator assembly for coupling to slider. Head gimbal assembly including flexure finger coupled to the slider. A head stack assembly including at least one of the head gimbal assemblies coupled to a head stack. Hard disk drive including head stack assembly. The invention includes manufacturing the slider, the head gimbal assembly, the head stack assembly, and the hard disk drive, as well as these items as products of the invention's manufacturing processes.

29 Claims, 9 Drawing Sheets

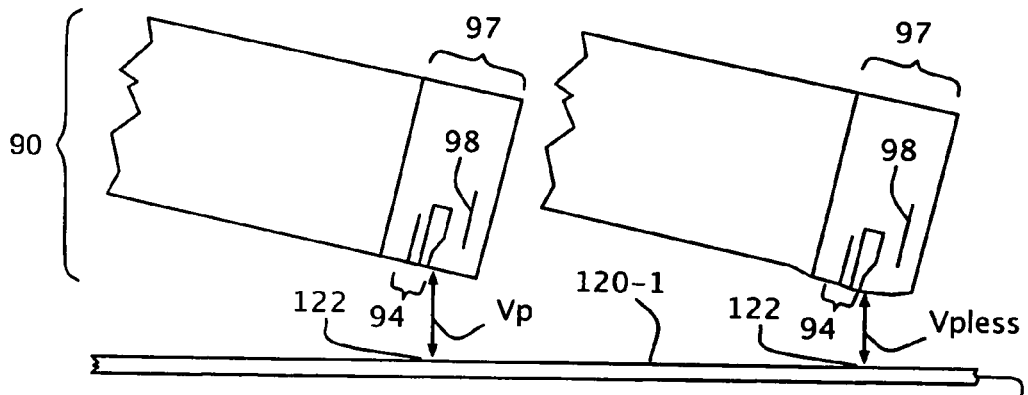
Fig. 1A Prior Art    Fig. 1B
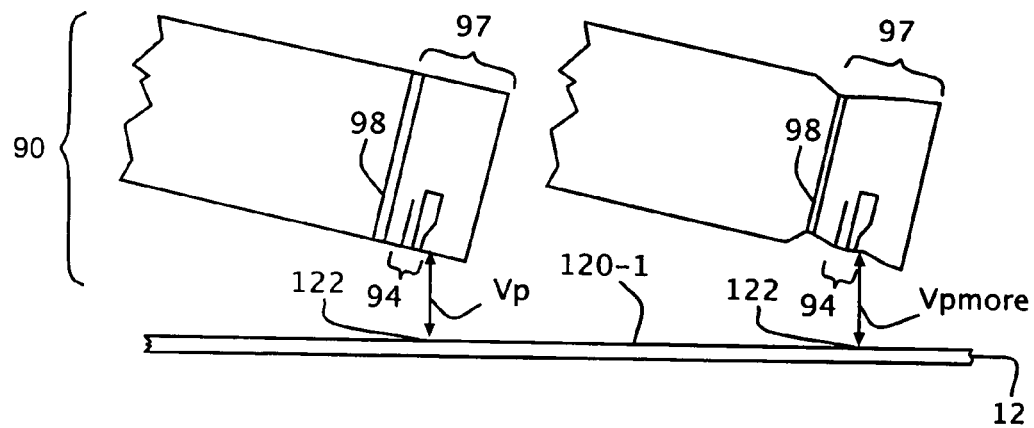
Fig. 1C
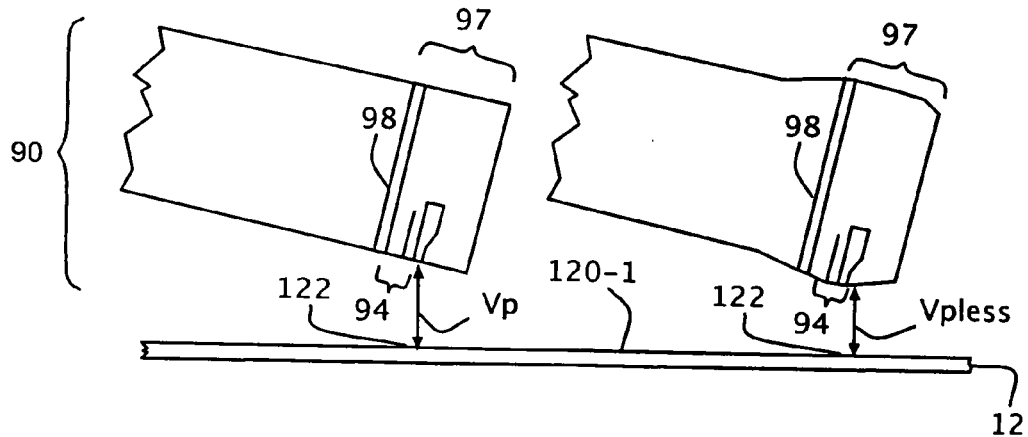

APPARATUS AND METHOD FOR PIEZOELECTRIC LAYER AS VERTICAL MICRO-ACTUATOR IN SLIDER OF A HARD DISK DRIVE

TECHNICAL FIELD

This invention relates to hard disk drives, in particular, to apparatus and methods for inclusion of amplification of the read signal in the slider of a hard disk drive.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access the data stored of the track.

Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon.

A central feature of the hard disk drive industry is its quest for greater data storage density, leading to continued reduction in track width, the flying height or vertical positioning of the read-write head off the rotating disk surface, and the size of the read head within the read-write head. As these factor shrink, the possibility of the read-write head contacting the rotating disk surface increases and the potential for damage to the disk surface and the There are a number of proposals and experimental devices pointing to mounting a vertical micro-actuator either directly coupled to the slider parallel the air bearing surface and often employing a piezoelectric effect to induce a strain on the slider to alter the vertical position of the read-write head above the rotating disk surface. These proposals have tended to be ineffective. Another alternative uses a heating element the vertical micro-actuator 98 embedded in a slider 90 to expand the slider distortion zone 97 and reduce the vertical distance Vp between the slider and a rotating disk surface 120-1 from an initial vertical distance Vp0 to a reduced vertical distance Vp1 as shown in FIG. 1A. While this approach is gaining favor at this time it has a significant limitation, it can only actively move the read-write head 94 closer to the rotating disk surface. There are situations where the read-write head needs to be further away from the rotating disk surface, and in those situations this approach does not help. What is needed is a vertical micro-actuator which can both actively lower and raise the read-write head.

SUMMARY OF THE INVENTION

The invention includes a slider used to access data on a rotating disk in a hard disk drive. the slider includes a vertical micro-actuator forming a piezoelectric layer perpendicular to an air bearing surface and coupled to a deformation region including the read-write head for accessing the data on the rotating disk surface. The slider further includes a vertical control signal for stimulating the vertical micro-actuator to alter the vertical position of the read-write head over the rotating disk surface, by providing a potential difference to a first slider power terminal. The vertical control signal stimulates the vertical micro-actuator to increase the vertical position when the potential difference is a first potential difference, and to decrease the vertical position when the potential difference is a second potential difference of opposite sign to the first.

The vertical control signal further stimulates the vertical micro-actuator as follows. The piezoelectric layer contracts when the potential difference is the first potential difference, urging the deformation region to increase the vertical position of the read-write head over the rotating disk surface. The piezoelectric layer expands when the potential difference is the second potential difference, urging the deformation region to decrease the vertical position.

The slider and its read-write head may further include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the vertical micro-actuator.

The invention includes a flexure finger including the vertical control signal path providing the vertical control signal to the slider and a micro-actuator assembly for coupling to the slider to aid in positioning the read-write head to access the data on the rotating disk surface. The micro-actuator assembly may aid in lateral positioning, and may further aid in vertical positioning. The micro-actuator assembly may employ a piezoelectric effect and/or an electrostatic effect to aid in positioning the read-write head.

The invention also includes a head gimbal assembly including the invention's flexure finger coupled to the slider, which further includes the micro-actuator assembly mechanically coupled to the slider and the vertical control signal path electrically coupled to the vertical control signal of the slider. The invention includes a head stack assembly including at least one of the head gimbal assemblies coupled to a head stack. The invention includes a hard disk drive including a head stack assembly, which includes at least one of the head gimbal assemblies.

The invention includes manufacturing the slider, the head gimbal assembly, the head stack assembly, and the hard disk drive, as well as these items as products of the invention's manufacturing processes.

BRIEF DESCRIPTION OF THE DRAWINGS

FIG. 1A shows an example prior art slider including a vertical micro-actuator employing a heater;

FIGS. 1B and 1C show an example of the invention's slider increasing the vertical distance and decreasing the vertical distance of its read-write head to the data on the rotating disk surface;

DETAILED DESCRIPTION

Figure 2A:
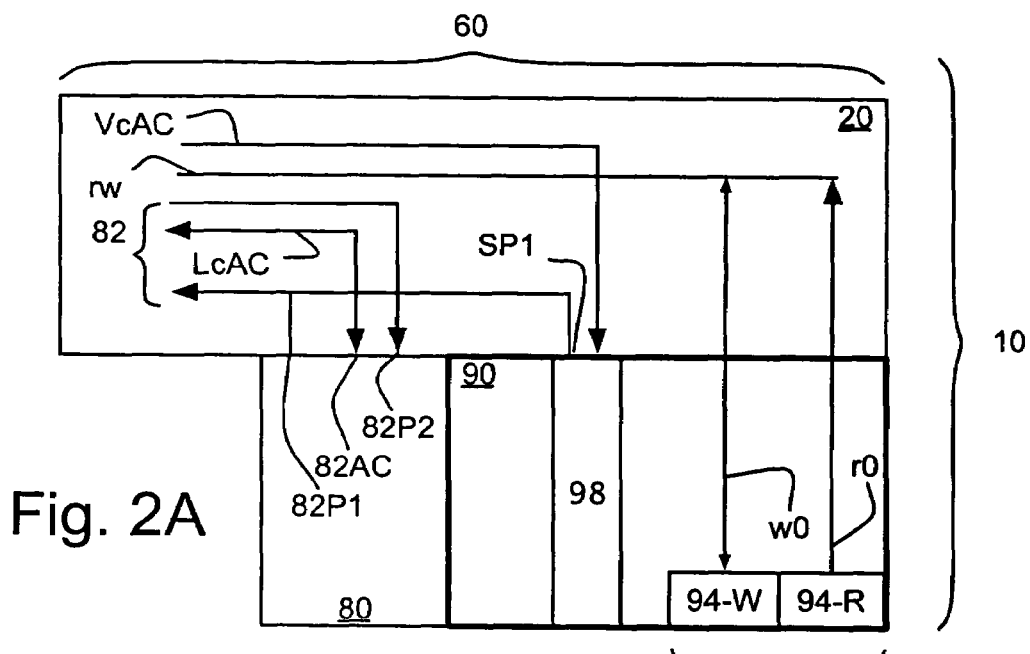
FIGS. 2A and 2B show some aspects of the invention's flexure finger and head gimbal assembly and their relationship with the invention's slider.

This invention relates to hard disk drives, in particular, to apparatus and methods for amplification of the read signal in the slider of a hard disk drive. In particular, a slider including a read-write head providing a read-differential signal pair to an amplifier to generate an amplified read signal, when the slider is used to read access data on a rotating disk surface in a hard disk drive. The slider reports the amplified read signal as a result of the read access of the data.

The slider 90 includes a vertical micro-actuator 98 forming a piezoelectric layer perpendicular to the air bearing surface 92 and coupled with a deformation region 97, which includes the read-write head 94, as shown in FIGS. 1B, 1C, 2A, 2B, 4B, 8B and 9A. The vertical micro-actuator is stimulated by the vertical control signal VcAC providing a potential difference with a first slider power terminal SP1, to alter a vertical position VP of the read-write head over the rotating disk surface 120-1 in a hard disk drive 10. The vertical control signal stimulates vertical micro-actuator to increase the vertical position when the potential difference is a first potential difference as shown in FIG. 1B. The piezoelectric layer contracts when stimulated by the first potential difference between the vertical control signal and the first slider power signal SP1, which urges the deformation region to increase the vertical position to Vp1 of the read-write head as shown on the right side of the Figure. And the vertical control signal stimulates vertical micro-actuator to decrease the vertical position when the potential difference is a second potential difference as shown in FIG. 1C. The second potential difference is preferably of the opposite sign of the first potential difference. The piezoelectric layer expands when the potential difference is the second potential difference, urging the read-write head to decrease the vertical position Vp2 of the read-write head.

Figure 8A:
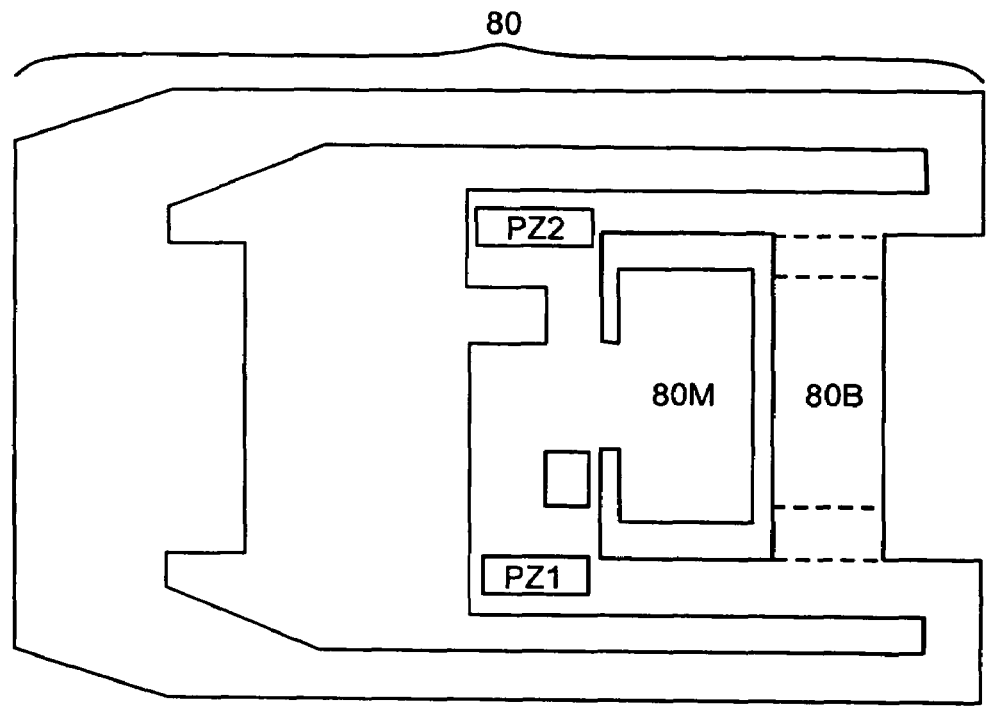
FIG. 8A shows an example of the use of the piezoelectric effect in the micro-actuator assembly of FIG. 4B.
Figure 8B:
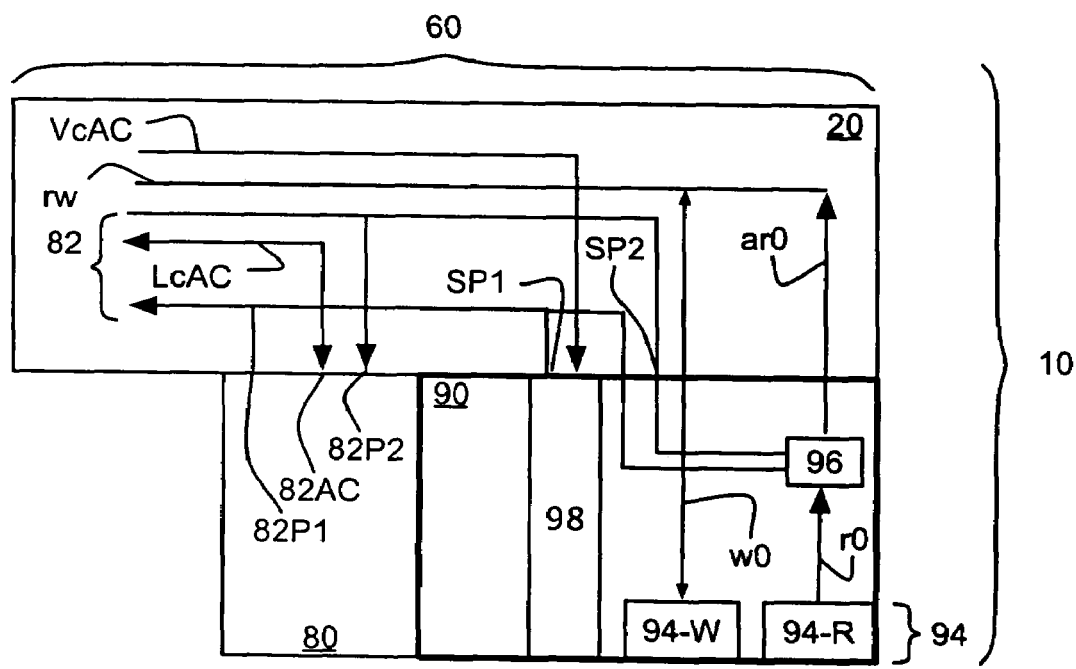
FIG. 8B shows a refinement of the head gimbal assembly, the flexure finger, and the slider of FIG. 2A.

The vertical micro-actuator 98 includes a piezoelectric layer stimulated by a potential difference between two electrical terminals, one of which may preferably be the first slider power terminal SP1 and the other terminal is connected to the vertical control signal VcAC, which may prefer an embodiment as shown in FIG. 8B. Today's read-write head has typically five wires: two providing a differential read signal pair r0, two providing a write differential signal pair w0, and one signal providing the vertical control signal VcAC. The vertical micro-actuator may preferably be grounded to the load beam 74 through a via in the flexure finger 20 coupled to the load beam to provide the first slider power terminal.

The slider 90 is used to access the data 122 on the rotating disk surface 120-1 in a hard disk drive 10. The data is typically organized in units known as a track 122, which are usually arranged in concentric circles on the rotating disk surface centered about a spindle shaft 40 and alternatively may be organized as joined spiral tracks. Operating the slider to read access the data on the rotating disk surface includes the read head 94-R driving the read differential signal pair r0 to read access the data on the rotating disk surface. The read-write head 94 is formed perpendicular to the air bearing surface 92 to the amplifier 96.

Figure 3A:
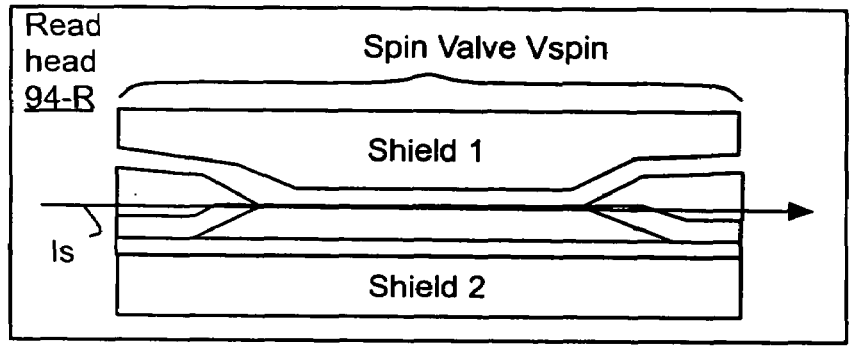
FIG. 3A shows an example of the read head of FIG. 2A employing a spin valve.

The read head 94-R may use a spin valve to drive the read differential signal pair as shown in FIG. 3A. As used herein, the spin valve employs a magneto-resistive effect to create an induced sensing current Is between the first shield Shield 1 and the second shield Shield 2. Spin valves have been in use the since the mid 1990's.

Figure 3B:
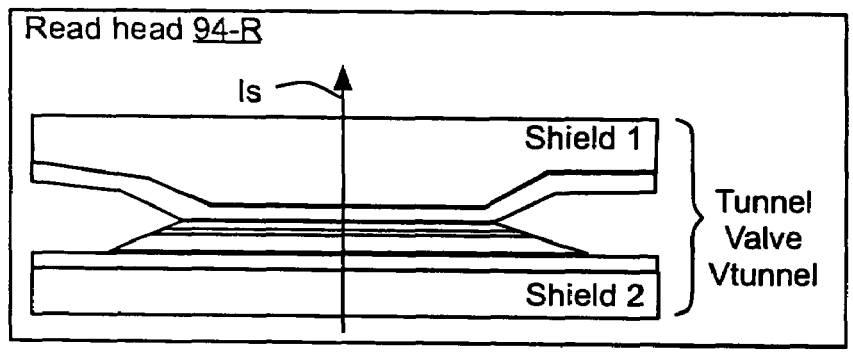
FIG. 3B shows an example of the read head of FIG. 2A employing a tunnel valve.
Figure 3C:
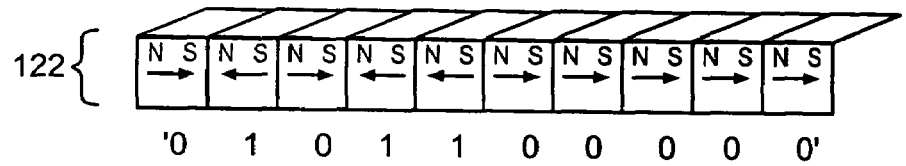
FIG. 3C shows a typical polarization of bits in the track on the rotating disk surface used with the spin valve of FIG. 3A.
Figure 3D:
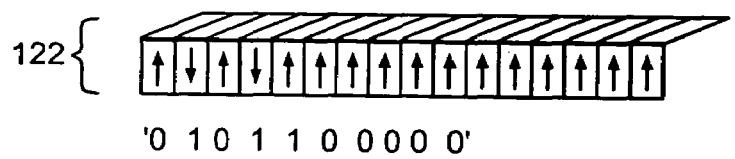
FIG. 3D shows a typical polarization of bits in the track on the rotating disk surface used with the tunneling valve of FIG. 3B.

The read head 94-R may use a tunnel valve to drive the read differential signal pair as shown in FIG. 3B. As used herein, a tunnel valve uses a tunneling effect to modulate the sensing current Is perpendicular to the first shield Shield 1 and the second shield Shield 2. Both longitudinally recorded signals as shown in FIG. 3C and perpendicularly recorded signals shown in FIG. 3D can be read by either reader type. Perpendicular versus longitudinal recording relates to the technology of the writer/media pair, not just the reader. This difference in bit polarization lead to the announcement of a large increase in data density, a jump of almost two hundred percent in the spring of 2005.

The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the rotating disk surface 120-1, results in a change of electrical resistance through the tunnel valve.

Figure 5:
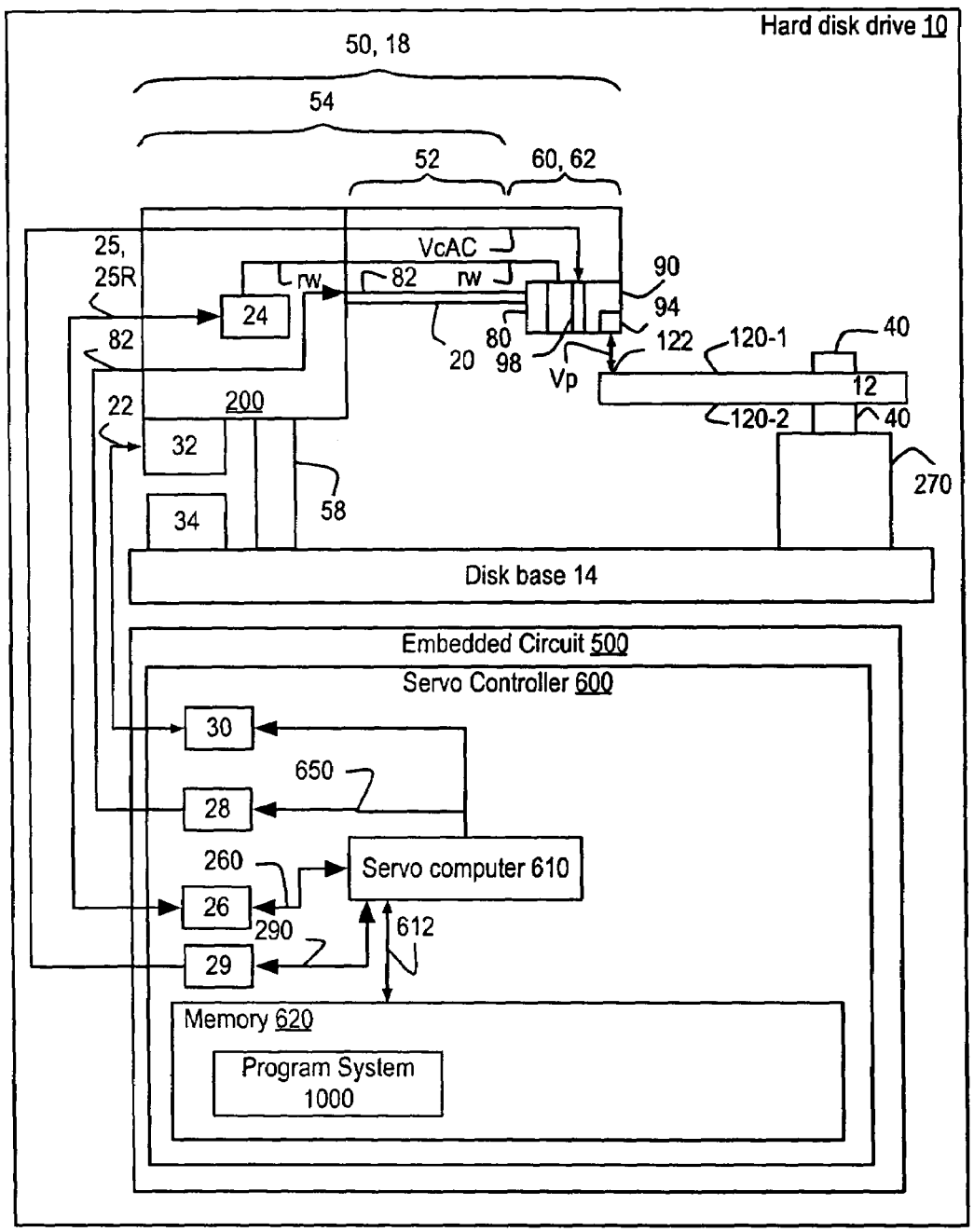
FIGS. 5 to 7 show some details of the hard disk drive of FIGS. 2A and 4A.

The invention's slider 90 may further include the read-write head 94 providing the read-differential signal pair r0 to the amplifier 96 to generate the amplified read signal ar0, as shown in FIGS. 5 and 8B. The read-write head preferably includes a read head 94-R driving the read differential signal pair r0 and a write head 94-W receiving a write differential signal pair w0. The slider reports the amplified read signal as a result of read access of the data on the rotating disk surface. In most but not necessarily all of the embodiments of the invention's slider 90, the amplifier 96 is preferably opposite the air bearing surface, as further shown in FIG. 8B. The amplified read signal ar0 may be implemented as an amplified read signal pair ar0+− or as a single ended read signal. The vertical micro-actuator 98 included in the slider 90 operates by inducing a strain on the deformation region 97 as well as any other materials directly coupled to it, making it preferable for the amplifier 96 be separated from the vertical micro-actuator and the deformation region, as shown in FIG. 8B. The invention's slider 90 includes the first slider power terminal SP1 and further includes a second slider power terminal SP2 collectively used to power the amplifier 96 in generating the amplified read signal ar0.

Manufacturing the invention's slider 90 includes coupling the read-write head 94 to the amplifier 96, which further includes electrically coupling the read differential signal pair to the amplifier. The invention includes the manufacturing process of the slider and the slider as a product of that manufacturing process. The manufacturing further includes providing an air bearing surface 92 near the read head 94-R, and in some embodiments, further providing the vertical micro-actuator 98.

Coupling the read-write head 94 to the amplifier 96 may further include bonding the amplifier to the read head 94-R and/or building the amplifier to the read head. Bonding the amplifier may include gluing, and/or welding, and/or soldering the amplifier to the read head. Building the amplifier may include depositing an insulator to create a signal conditioning base, and/or using a slider substrate as a signal conditioning base, and/or depositing a first semiconductor layer on the signal conditioning base. The building may further include define at least one pattern, at least one etch of the pattern to create at least one layer, for at least one semiconducting material and at least one layer of metal to form at least one transistor circuit embodying the amplifier. The transistors preferably in use at the time of the invention include, but are not limited to, bipolar transistors, Field Effect Transistors (FETs), and amorphous transistors.

The invention includes a flexure finger 20 for the slider 90, providing the vertical control signal VcAC, the lateral control signal 82 and trace paths between the slider and the preamplifier for the read differential signal pair r0 and the write differential signal pair w0. The lateral control signal preferably includes the first lateral control signal 82P1 and the second lateral control signal 82P2, as well as the AC lateral control signal 82AC.

The flexure finger may include a micro-actuator assembly 80 for mechanically coupling with the slider to aid in positioning the slider to access the data 122 on the rotating disk surface 120-1. The micro-actuator assembly may aid in laterally positioning LP the slider to the rotating disk surface 120-1 as shown in FIG. 3A and/or aid in vertically positioning VP the slider as shown in FIGS. 1B, 1C and 5.

The micro-actuator assembly 80 may employ a piezoelectric effect and/or an electrostatic effect to aid in positioning the slider 90. First, examples of micro-actuator assemblies employing the piezoelectric effect will be discussed followed by electrostatic effect examples. In several embodiments of the invention the micro-actuator assembly may preferably couple with the head gimbal assembly 60 through the flexure finger 20, as shown in FIGS. 2A, 2B, 5 and 8B. The micro-actuator assembly may further couple through the flexure finger to a load beam 74 to the head gimbal assembly and consequently to the head stack assembly 50.

Figure 4A:
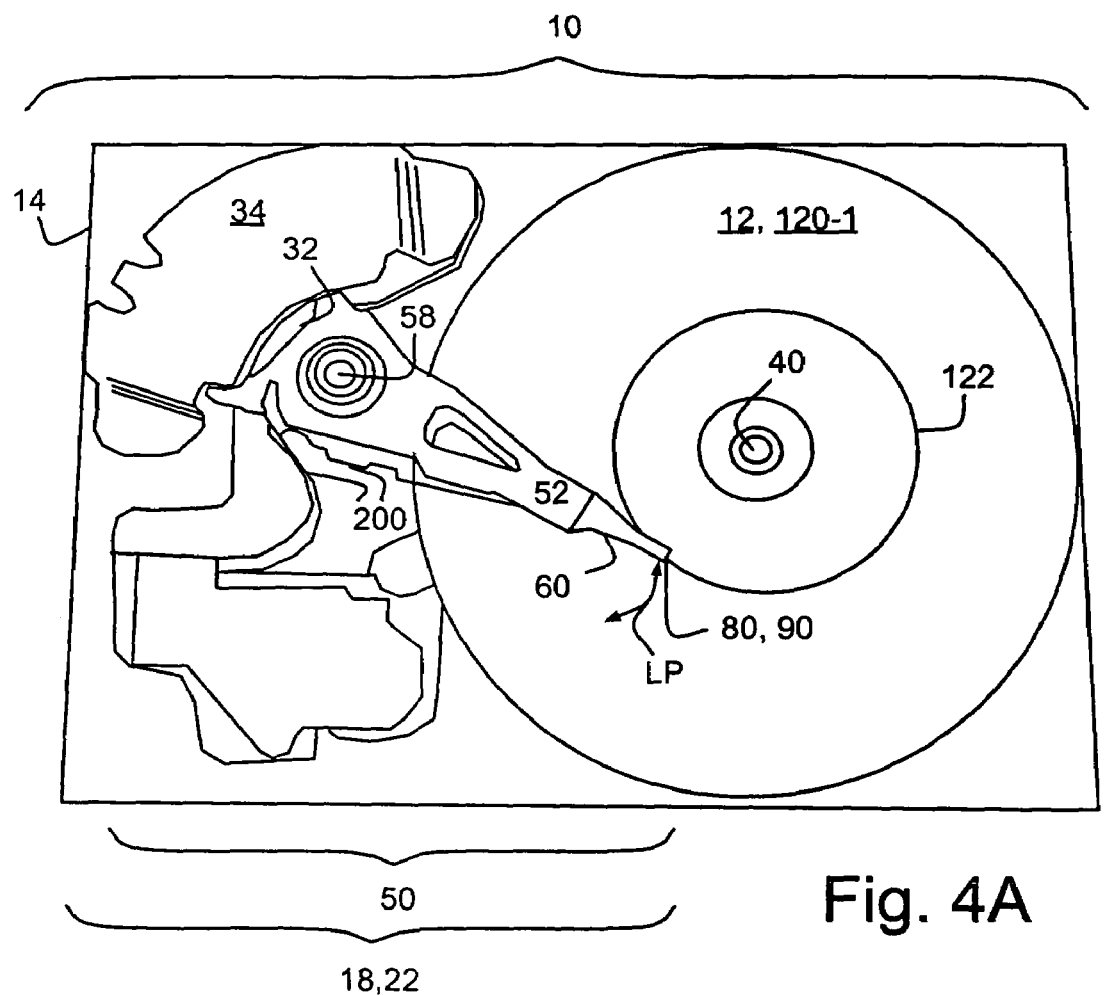
FIG. 4A shows a partially assembled hard disk drive of FIG. 2A.
Figure 4B:
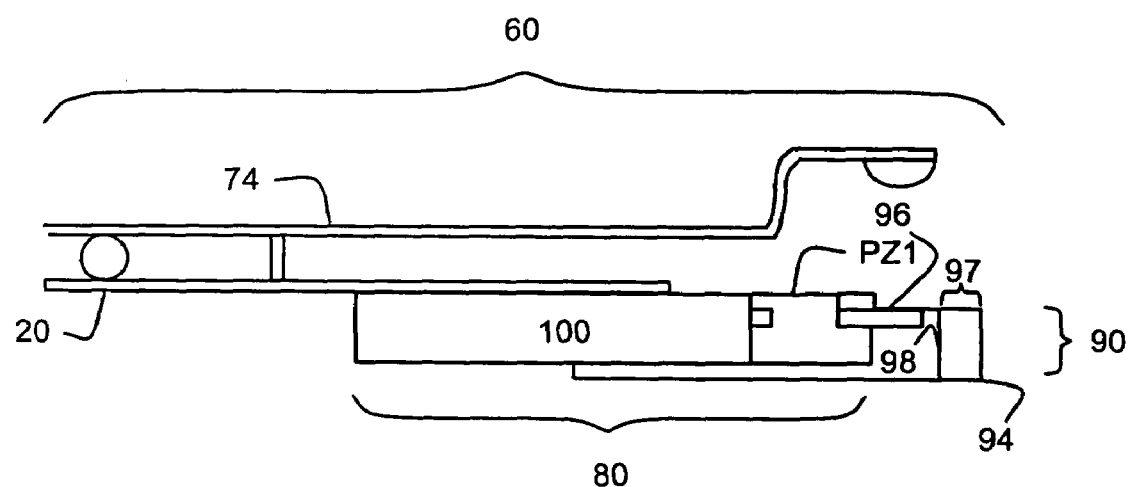
FIG. 4B shows the head gimbal assembly of FIGS. 2A and 2B including the slider of coupled with a micro-actuator assembly using the piezoelectric effect.

Examples of micro-actuator assemblies employing the piezoelectric effect are shown in FIGS. 4B and 8A. FIG. 4B shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. The micro-actuator assembly may include the first piezoelectric element and a second piezoelectric element PZ2, both of which may preferably aid in laterally positioning the slider. In certain embodiments, the micro-actuator assembly may be coupled with the slider with a third piezoelectric element PZ3 to aid in the vertically positioning the slider to the rotating disk surface 120-1.

Figure 9A:
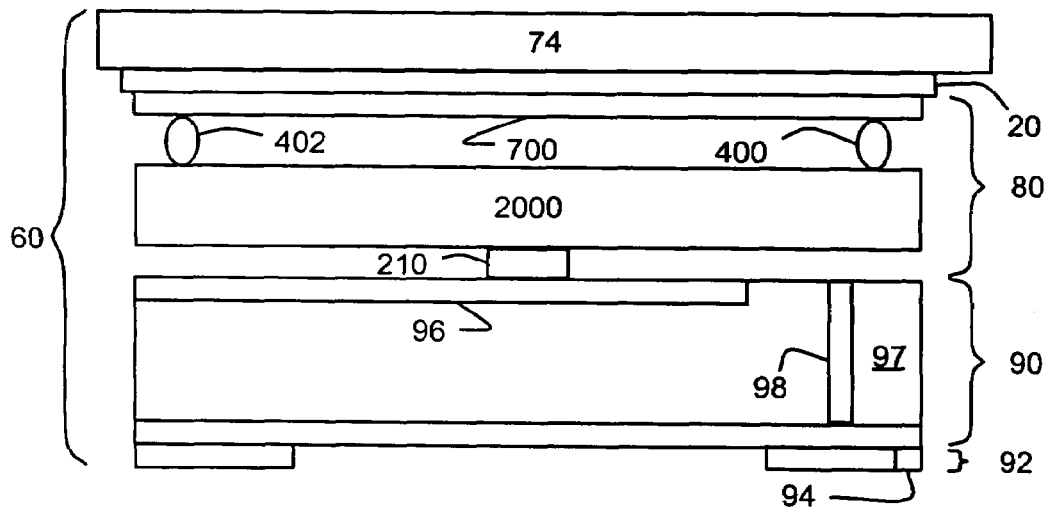
FIGS. 9A and 9B show an example of the use of the electrostatic effect in a micro-actuator assembly for the head gimbal assembly of FIG. 2A.
Figure 9B:
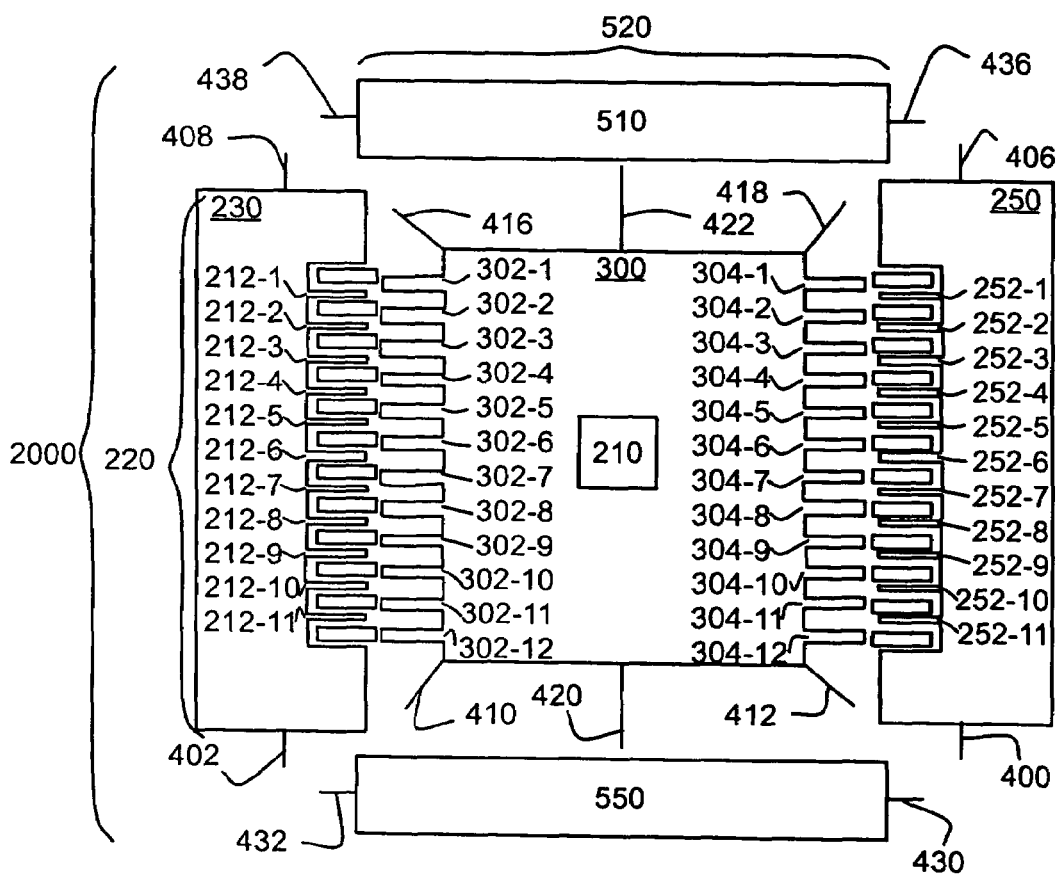

Examples of the invention using micro-actuator assemblies employing the electrostatic effect are shown in FIGS. 9A and 9B derived from the Figures of U.S. patent application Ser. No. 10/986,345, which is incorporated herein by reference. FIG. 9A shows a schematic side view of the micro-actuator assembly 80 coupling to the flexure finger 20 via a micro-actuator mounting plate 700. FIG. 9B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the amplified read signal ar0 and the write differential signal pair W0 of the read-write head 94 of the slider 90.

The bonding block 210 preferably electrically couples the read-write head 90 to the amplified read signal ar0 and write differential signal pair W0, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the rotating disk surface 120-1. This lateral motion is a first mechanical degree of freedom, which results from the first stator 230 and the second stator 250 electrostatically interacting with the central movable section 300. The first micro-actuator 220 may act as a lateral comb drive or a transverse comb drive, as is discussed in detail in the incorporated United States patent application.

The electrostatic micro-actuator assembly 2000 may further include a second micro-actuator 520 including a third stator 510 and a fourth stator 550. Both the third and the fourth stator electostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated United States patent application. The second micro-actuator may also provide motion sensing, which may indicate collision with the rotating disk surface 120-1 being accessed.

The central movable section 300 not only positions the read-write head 10, but is the conduit for the amplified read signal ar0, the write differential signal pair W0 and in certain embodiments, the first slider power signal SP1 and the second slider power signal SP2. The electrical stimulus of the first micro-actuator 220 is provided through some of its springs.

The central movable section 300 may preferably to be at ground potential, and so does not need wires. The read differential signal pair r0, write differential signal pair w0 and slider power signals SP1 and SP2 traces may preferably be routed with flexible traces all the way to the load beam 74 as shown in FIG. 9A.

The flexure finger 20 may further provide a read trace path rtp for the amplified read signal ar0, as shown in FIG. 8B. The slider 90 may further include a first slider power terminal SP1 and a second slider power terminal SP2, both electrically coupled to the amplifier 96 to collectively provide power to generate the amplified read signal ar0. The flexure finger 20 may further include a first power path SP1P electrically coupled to said first slider power terminal and/or a second power path SP2P electrically coupled to the second slider power terminal SP2, which are collectively used to provide electrical power to generate the amplified read signal.

The invention includes the head gimbal assembly 60 containing the flexure finger 20 coupled with the slider 90 providing the vertical control signal VcAC to the vertical micro-actuator 98, and a micro-actuator assembly 80 mechanically coupling to the slider to aid in positioning the slider to access the data 122 on the rotating disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the rotating disk surface, which includes providing electrical power to the micro-actuator assembly and driving the vertical control signal. The first micro-actuator power terminal may be tied to the first slider power terminal, and both electrically coupled to the first power path.

Figure 2B:
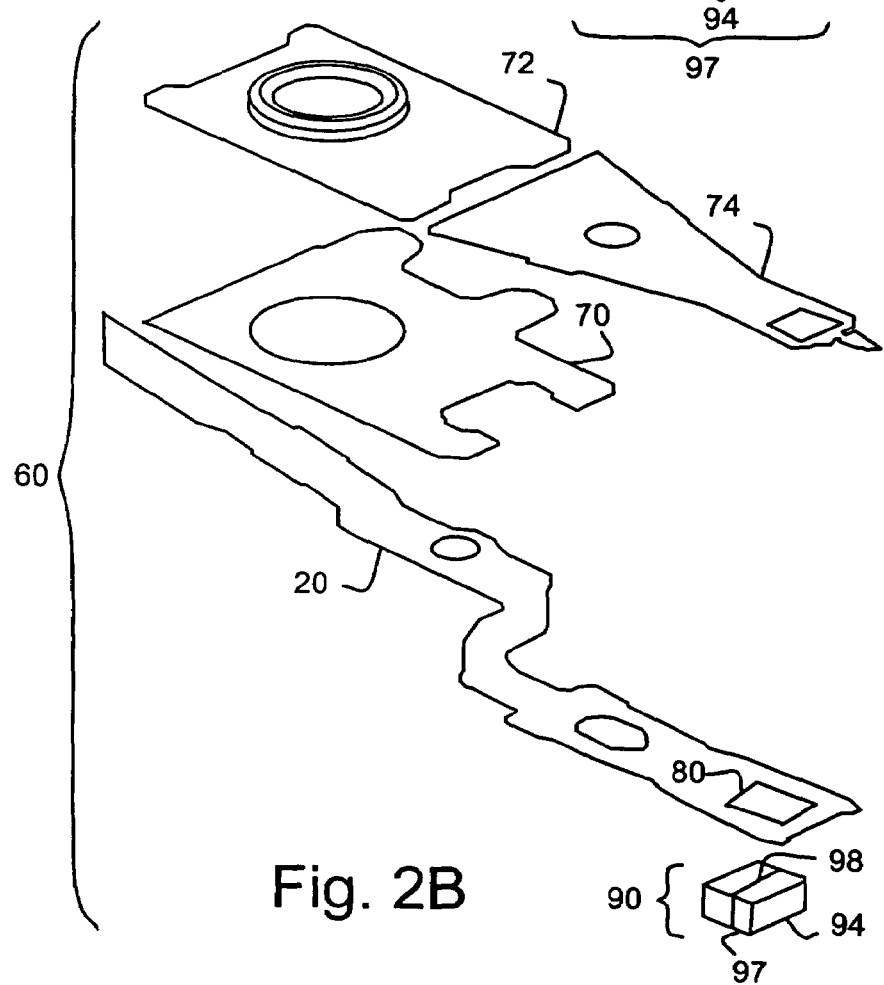

The flexure finger 20 may be coupled to the load beam 74 as shown in FIGS. 2B and 9A, which may further include the first power path SP1P electrically coupled to a metallic portion of the load beam. In certain embodiments, the metallic portion of the load beam may be essentially all of the load beam.

The head gimbal assembly 60 may further include the amplifier 96 to generate the amplified read signal ar0 using the first slider power terminal SP1 and the second slider power terminal SP2. The flexure finger 20 may further contain a read trace path rtp electrically coupled to the amplified read signal ar0, as shown in FIG. 8B. The head gimbal assembly operates as follows when read accessing the data 122, preferably organized as the track 122, on the rotating disk surface 120-1. The slider 90 reports the amplified read signal ar0 as the result of the read access. The flexure finger provides the read trace path rtp for the amplified read signal.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly.

Manufacturing the invention's head gimbal assembly 60 includes coupling the flexure finger 20 to the invention's slider 90, which further includes mechanically coupling the micro-actuator assembly 80 to the slider and electrically coupling the flexure finger to provide the vertical control signal VcAC to the slider. Coupling the flexure finger 20 to the slider 90 may further include electrically coupling the read trace path rtp with the amplified read signal ar0. Coupling the micro-actuator assembly to the slider may include electrically coupling the first micro-actuator power terminal 82P1 to the first slider power terminal SP1P and/or electrically coupling the second micro-actuator power terminal 82P2 to the second slider power terminal SP2P. The invention includes this manufacturing process and the head gimbal assembly as a product of the process.

Figure 6:
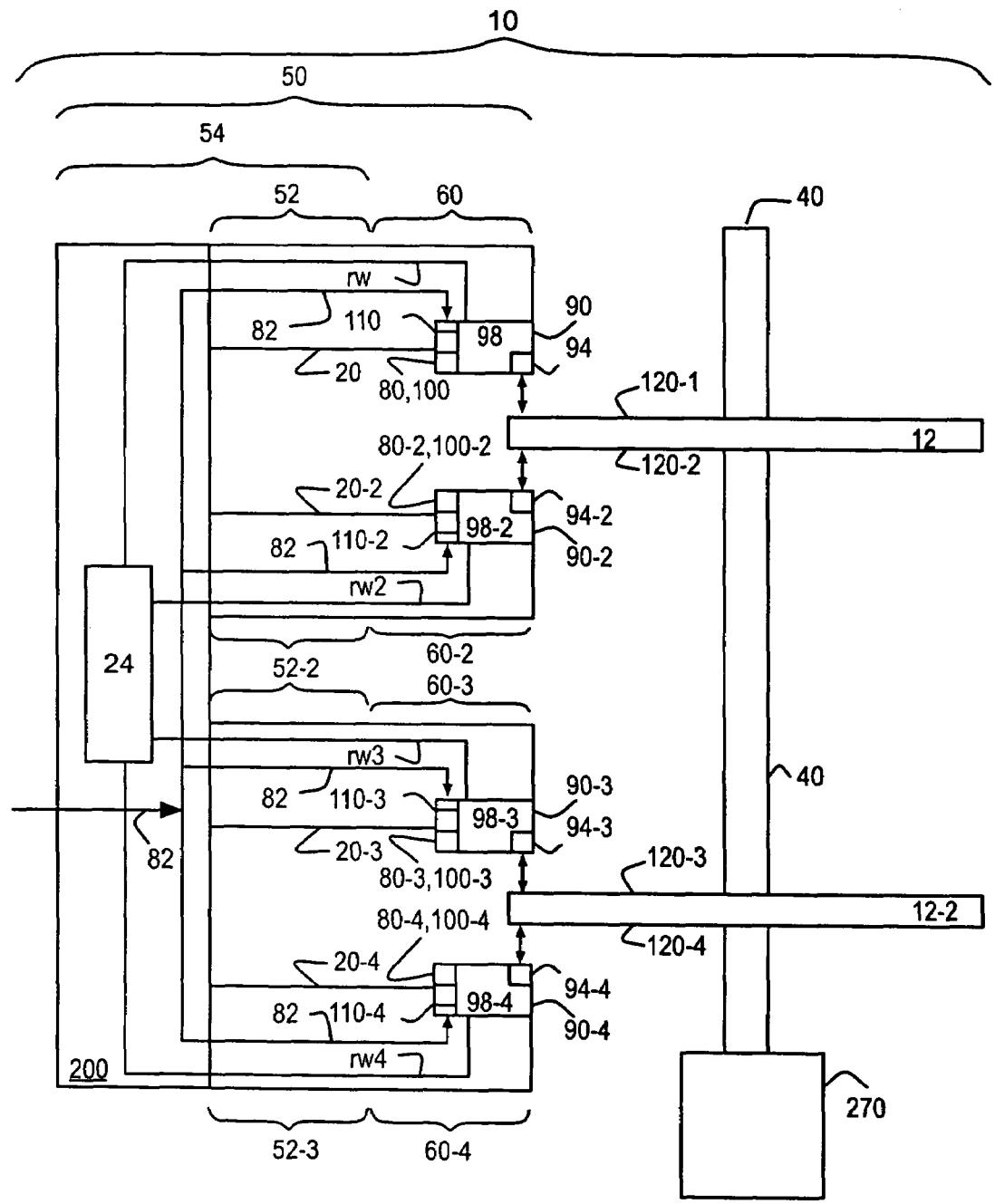
Figure 7:
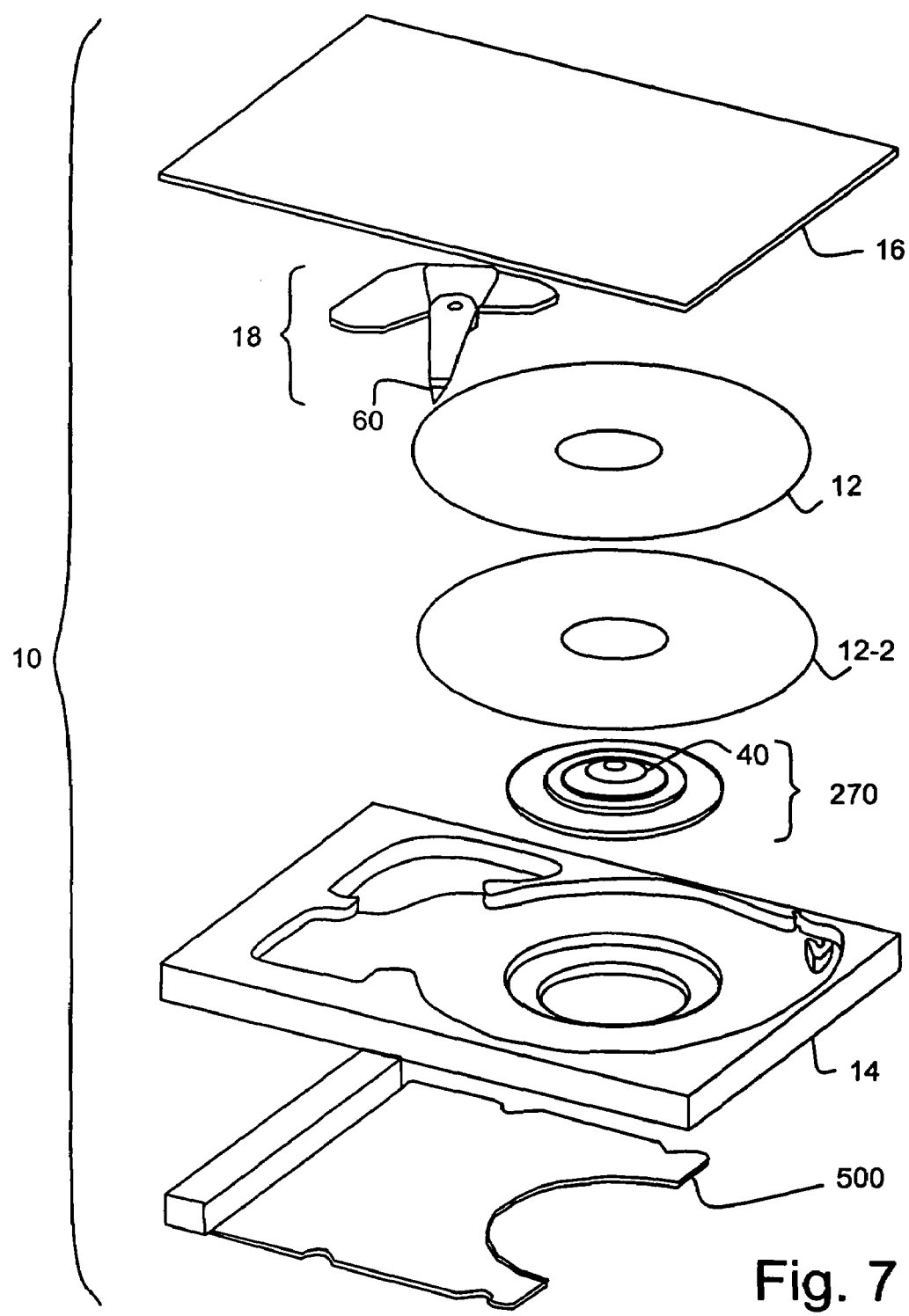

The invention also includes a head stack assembly 50 containing at least one head gimbal assembly 60 coupled to a head stack 54, as shown in FIGS. 5 and 6. The head stack assembly operates as follows when read accessing the data 122, preferably organized as the track 122, on the rotating disk surface 120-1.

The head stack assembly 50 may include more than one head gimbal assembly 60 coupled to the head stack 54. By way of example, FIG. 6 shows the head stack assembly coupled with a second head gimbal assembly 60-2, a third head gimbal assembly 60-3 and a fourth head gimbal assembly 60-4. Further, the head stack is shown in FIG. 5 including the actuator arm 52 coupling to the head gimbal assembly. In FIG. 6, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

In certain embodiments where the slider 90 includes the amplifier 96, the slider reports the amplified read signal ar0 as the result of the read access. The flexure finger provides the read trace path rtp for the amplified read signal, as shown in FIG. 4B. The main flex circuit 200 receives the amplified read signal from the read trace path to create the read signal 25-R. The head stack assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal ar0 as a result of the read access to the track 122 on the rotating disk surface 120-1.

Manufacturing the invention's head stack assembly 50 includes coupling said at least one of the invention's head gimbal assembly 60 to the head stack 50 to at least partly create said head stack assembly. The manufacturing process may further include coupling more than one head gimbal assemblies to the head stack. The manufacturing may further, preferably include coupling the main flex circuit 200 to the flexure finger 20, which further includes electrically coupled the preamplifier 24 to the read trace path rtp to provide the read signal 25-R as a result of the read access of the data 122 on the rotating disk surface 120-1. The invention includes the manufacturing process for the head stack assembly and the head stack assembly as a product of the manufacturing process. The step coupling the head gimbal assembly 60 to the head stack 50 may further, preferably include swaging the base plate 72 to the actuator arm 52.

The invention includes a hard disk drive 10, shown in FIGS. 2A, 4A, 5, 6, and 7, to include the head stack assembly 50 pivotably mounted through the actuator pivot 58 on a disk base 14 and arranged for the slider 90 of the head gimbal assembly 60 to be laterally positioned LP near the data 122 for the read-write head 94 to access the data on the rotating disk surface 120-1. The disk 12 is rotatably coupled to the spindle motor 270 by the spindle shaft 40. The head stack assembly is electrically coupled to an embedded circuit 500. The data may be organized on the rotating disk surface either as a radial succession of concentric circular tracks or a radial succession of joined spiral tracks.

The hard disk drive 10 operates as follows when accessing the data 122 on the rotating disk surface 120-1. When the data access is underway, the spindle motor 270 is directed by the embedded circuit 500 to rotate the disk 12, creating the rotating disk surface for access by the read-write head 94.

The hard disk drive 10 may include the servo controller 600, and possibly the embedded circuit 500, coupled to the voice coil motor 18, to provide the micro-actuator stimulus signal 650 driving the micro-actuator assembly 80, and the read signal 25-R based upon the amplified read signal ar0 contained in the read-write signal bundle rw from the read-write head 94 to generate the Position Error Signal 260.

The embedded circuit 500 may preferably include the servo controller 600, as shown in FIG. 5, including a servo computer 610 accessibly coupled 612 to a memory 620. A program system 1000 may direct the servo computer in implementing the method operating the hard disk drive 10. The program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC.

The voice coil driver 30 preferably stimulates the voice coil motor 18 through the voice coil 32 to provide coarse position of the slider 90, in particular, the read head 94-R near the track 122 on the rotating disk surface 120-1.

The embedded circuit 500 may further process the read signal 25-R during the read access to the data 122 on the rotating disk surface 120-1. The slider 90 reports the amplified read signal ar0 as the result of a read access of the data 122 on the rotating disk surface 120-1. The flexure finger 20 provides the read trace path rtp for the amplified read signal, as shown in FIG. 4B. The main flex circuit 200 receives the amplified read signal from the read trace path to create the read signal 25-R. The embedded circuit receives the read signal to read the data on the rotating disk surface.

As stated before, the slider 90 reporting the amplified read signal may further include the read head 94-R driving the read differential signal pair r0 in reading the data 122 on the rotating disk surface 120-1 and the amplifier 96 receiving the read differential signal pair to generate the amplified read signal ar0.

A computer as used herein may include at least one instruction, processor and at least one data processor, where each of the data processors is directed by at least one of the instruction processors.

Manufacturing the hard disk drive 10 may include pivotably mounting the head stack assembly 50 by an actuator pivot 58 to the disk base 14 and arranging the head stack assembly, the disk 12, and the spindle motor 270 for the slider 90 of the head gimbal assembly 60 to access the data 122 on the rotating disk surface 120-1 of the disk 12 rotatably coupled to the spindle motor, to at least partly create the hard disk drive. The invention includes this manufacturing process and the hard disk drive as a product of that process.

Manufacturing may further include electrically coupling the invention's head stack assembly 50 to the embedded circuit 500 to provide the read signal 25-R as the result of the read access of the data 122 on the rotating disk surface 120-1. Making the hard disk drive 10 may further include coupling the servo controller 600 and/or the embedded circuit 500 to the voice coil motor 18 and providing the micro-actuator stimulus signal 650 to drive the micro-actuator assembly 80.

Making the servo controller 600 and/or the embedded circuit 500 may include programming the memory 620 with the program system 1000 to create the servo controller and/or the embedded circuit, preferably programming a non-volatile memory component of the memory.

Making the embedded circuit 500, and in some embodiments, the servo controller 600, may include installing the servo computer 610 and the memory 620 into the servo controller and programming the memory with the program system 1000 to create the servo controller and/or the embedded circuit.

Looking at some of the details of FIG. 6, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the embedded circuit 500 and/or the servo controller 600 direct the spindle motor 270 to rotate the spindle shaft 40. This rotating is very stable, providing a nearly constant rotational rate through the spindle shaft to at least one disk 12 and sometimes more than one disk. The rotation of the disk creates the rotating disk surface 120-1, used to access the track 122 while accessing the track. These accesses normally provide for reading the track and/or writing the track.

The hard disk drive 10 may operate by driving the vertical control signal VcAC toward the first potential difference with the first slider power terminal SP1 to stimulate the vertical micro-actuator 98 to increase the vertical position Vp of the read-write head 94 to the rotating disk surface 120-1, as shown in FIG. 1B. The operation may be performed during the seeking of the track 122 and during the following of the track. Additionally, the vertical control signal may be driven toward the second potential difference with the first slider power terminal to stimulate the vertical micro-actuator to decrease the vertical position, which is typically needed during the following of the track, but may optionally be part of the seeking of the track, possibly in transition to following the track. The servo controller 600 may include means for driving the vertical control signal toward the first potential difference and means for driving the vertical control signal toward the second potential difference, which may be at least partly implemented by the vertical control driver 29 creating the vertical control signal to be provided to the vertical micro-actuator. The vertical control driver is typically an analog circuit with a vertical position digital input 290 driven by the servo computer 610 to create the vertical control signal.

Track following and track seeking may be implemented as means for track seeking and means for track following, one or both of which may be implemented at least in part as program steps in the program system 1000 residing in the memory 620 accessibly coupled 612 to the servo computer 610 shown in FIG. 5. Alternatively, the means for track seeking and/or the means for track following may be implemented as at least one finite state machine.

The preceding embodiments provide examples of the invention and are not meant to constrain the scope of the following claims.

What is claimed is:

1. A slider, comprising:
   a vertical micro-actuator forming a piezoelectric layer perpendicular to an air bearing surface and coupled to a deformation region including a read-write head for accessing data on a rotating disk surface in a hard disk drive; and
   a vertical control signal stimulating said vertical micro-actuator to alter a vertical position of said read-write head over said rotating disk surface by providing a potential difference to a first slider power terminal, further comprises:
   said vertical control signal stimulating said vertical micro-actuator to increase said vertical position when said potential difference is a first potential difference; and
   said vertical control signal stimulating said vertical micro-actuator to decrease said vertical position when said potential difference is a second potential difference of the opposite sign of said first potential difference.

2. The slider of claim 1,
   wherein said vertical control signal stimulating said vertical micro-actuator to increase said vertical position, further comprises:
   said piezoelectric layer contracts when said potential difference is said first potential difference, urging said deformation region to increase said vertical position of said read-write head; and
   wherein said vertical control signal stimulating said vertical micro-actuator to decrease said vertical position, further comprises:
   said piezoelectric layer expands when said potential difference is said second potential difference, urging said deformation region to decrease said vertical position of said read-write head.

3. The slider of claim 1, wherein said read-write head, includes:
   a read head using a member of the group, consisting of: a spin valve to read said data on said rotating disk surface, and a tunneling valve to read said data on said rotating disk surface.

4. The slider of claim 3, wherein said slider further comprises:
   said read-write head providing a read differential signal pair to an amplifier to generate an amplified read signal reported by said slider as a result of read access of said data on said rotating disk surface.

5. The slider of claim 4, wherein said amplifier is opposite said air bearing surface.

6. The slider of claim 4, wherein said amplifier is separate from said deformation region.

7. The slider of claim 6, wherein said amplifier is separate from said vertical micro-actuator.

8. A flexure finger for said slider of claim 1, comprising:
   a vertical control signal path providing said vertical control signal to said slider; and
   a micro-actuator assembly for coupling to said slider to aid in positioning said slider to access said data on said rotating disk surface.

9. The flexure finger of claim 8, wherein said micro-actuator assembly aids in laterally positioning said read-write head to access said data on said rotating disk surface.

10. The flexure finger of claim 9, wherein said micro-actuator assembly aids in vertically positioning said read-write head to access said data on said rotating disk surface.

11. The flexure finger of claim 8, wherein said micro-actuator assembly employs at least one member of the group consisting of a piezoelectric effect and an electrostatic effect, to position said slider to access said data on said rotating disk surface.

12. A head gimbal assembly, comprising: said flexure finger of claim 8 coupled with said slider, further comprising:
   said micro-actuator mechanically coupled to said slider to aid in positioning said slider to access said data on said rotating disk surface; and
   said vertical control signal path electrically coupled to said vertical control signal of said slider.

13. The head gimbal assembly of claim 12, further comprising:
   a load beam electrically coupled through a via to said flexure finger to said first slider power terminal in said slider.

14. The head gimbal assembly of claim 12, wherein said micro-actuator assembly includes a first micro-actuator power terminal electrically coupled to said first slider power terminal.

15. A head stack assembly, comprising: at least one of the head gimbal assemblies of claim 12 coupled to a head stack.

16. The head stack assembly of claim 15, further comprising: at least two of said head gimbal assemblies coupled to said head stack.

17. The hard disk drive, comprising: said head stack assembly of claim 15 pivotably mounted on a disk base and arranged for said slider of said head gimbal assembly to access said data on said rotating disk surface of said disk rotatably coupled to a spindle motor.

18. A method of manufacturing said hard disk drive of claim 17, comprising the steps;
   pivotably mounting said head stack assembly by an actuator pivot to said disk base;
   arranging said head stack assembly, said disk, and said spindle motor for said slider of said head gimbal assembly to access said data on said rotating disk surface of said disk rotatably coupled to said spindle motor to create said hard disk drive.

19. The hard disk drive as a product of the process of claim 18.

20. A method of operating said hard disk drive of claim 17, comprising the steps:
   driving said vertical control signal toward said first potential difference to stimulate said vertical micro-actuator to increase said vertical position; and
   driving said vertical control signal toward said second potential difference to stimulate said vertical micro-actuator to decrease said vertical position.

21. The method of claim 20, further comprising the steps:
seeking a track of said data on said rotating dusk surface, further comprising the step:
driving said vertical control signal toward said first potential difference to stimulate said vertical micro-actuator to increase said vertical position; and
following said track of said data on said rotating disk surface, further comprising the steps:
driving said vertical control signal toward said first potential difference to stimulate said vertical micro-actuator to increase said vertical position; and
driving said vertical control signal toward said second potential difference to stimulate said vertical micro-actuator to decrease said vertical position.

22. A method of manufacturing said head stack assembly of claim 15, comprising the step:
coupling said at least one of head gimbal assembly to said head stack to create said head stack assembly.

23. The head stack assembly as a product of the process of claim 22.

24. A method of manufacturing said head gimbal assembly of claim 12, comprising the step:
coupling said flexure finger with said slider to create said head gimbal assembly, further comprising the steps:
mechanically coupling said micro-actuator assembly to said slider; and
electrically coupling said first slider power terminal through said flexure finger.

25. The head gimbal assembly as a product of the process of claim 24.

26. A method of manufacturing said flexure finger of claim 8, comprising the steps:
forming said vertical control signal path and said micro-actuator assembly to create said flexure finger.

27. The flexure finger as a product of the process of claim 26.

28. A method of manufacturing said slider of claim 1, comprising the steps:
forming said vertical micro-actuator as said piezoelectric layer;
forming said deformation region including said read-write head;
coupling said piezoelectric layer to said deformation region; and
forming said air bearing surface perpendicular to said piezoelectric layer to create said slider.

29. The slider as a product of the process of claim 28.

* * * * *